US007292931B2

(12) United States Patent
Davis et al.

(10) Patent No.: US 7,292,931 B2
(45) Date of Patent: Nov. 6, 2007

(54) MODEL-BASED INLET AIR DYNAMICS STATE CHARACTERIZATION

(75) Inventors: Ronald A. Davis, Commerce Township, MI (US); Gregory P. Matthews, West Bloomfield, MI (US); Layne K. Wiggins, Plymouth, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 75 days.

(21) Appl. No.: 11/363,075

(22) Filed: Feb. 27, 2006

(65) Prior Publication Data

US 2006/0276953 A1 Dec. 7, 2006

Related U.S. Application Data

(60) Provisional application No. 60/686,467, filed on Jun. 1, 2005.

(51) Int. Cl.
*G06F 19/00* (2006.01)
*G01M 19/00* (2006.01)

(52) U.S. Cl. ....................... 701/110; 701/102; 73/118.1

(58) Field of Classification Search ................ 701/101, 701/102, 110, 111, 114, 115; 73/116, 118.2
See application file for complete search history.

(56) References Cited

U.S. PATENT DOCUMENTS

| | | | | |
|---|---|---|---|---|
| 6,636,796 | B2 * | 10/2003 | Kolmanovsky et al. | 701/104 |
| 6,701,247 | B2 * | 3/2004 | Lee | 701/114 |
| 6,966,287 | B1 * | 11/2005 | Livshiz et al. | 123/90.15 |
| 7,010,413 | B2 * | 3/2006 | Dudek et al. | 701/102 |
| 7,021,282 | B1 * | 4/2006 | Livshiz et al. | 123/347 |
| 2002/0133286 | A1 * | 9/2002 | Kolmanovsky et al. | 701/104 |
| 2003/0029233 | A1 * | 2/2003 | Ting et al. | 73/118.1 |
| 2003/0195682 | A1 * | 10/2003 | Lee | 701/34 |
| 2004/0083047 | A1 * | 4/2004 | Li et al. | 701/102 |
| 2005/0060084 | A1 * | 3/2005 | Dudek et al. | 701/102 |

* cited by examiner

*Primary Examiner*—John T. Kwon

(57) ABSTRACT

An inlet air dynamics (IAD) characterization control system for an internal combustion engine includes a first module that estimates a future firing event manifold absolute pressure (MAP) and a second module that determines a MAP cycle difference based on the future firing event MAP and a previous cycle MAP. A third module characterizes an IAD state based on the MAP cycle difference.

20 Claims, 3 Drawing Sheets

MODEL-BASED INLET AIR DYNAMICS STATE CHARACTERIZATION

CROSS-REFERENCE TO RELATED APPLICATIONS

This application claims the benefit of U.S. Provisional Application No. 60/686,467, filed on Jun. 1, 2005. The disclosure of the above application is incorporated herein by reference.

FIELD OF THE INVENTION

The present invention relates to engines, and more particularly to characterizing an inlet air dynamics state of an engine to improve fuel control.

BACKGROUND OF THE INVENTION

Internal combustion engines combust a fuel and air mixture within cylinders driving pistons to produce drive torque. More specifically, air is drawn into an intake manifold of the engine through a throttle. The air is distributed to cylinders of the engine and is mixed with fuel at a desired air-to-fuel (A/F) ratio. The A/F mixture is combusted within the cylinders to drive the pistons.

The amount of fuel to the individual cylinders is controlled using, for example, port fuel injection. In order to provide the desired A/F ratio, the corresponding air rate of each cylinder must be accurately estimated. In order to accurately estimate the cylinder air rate, the state of the engine inlet air dynamics is characterized as either transient or steady-state. A corresponding cylinder air rate estimation approach is implemented based on the engine inlet air dynamics characterization.

When in steady-state, the manifold absolute pressure (MAP) is substantially constant over a predetermined time period. In this case, precise cylinder inlet air rate estimation is provided using a conventional mass air flow (MAF) sensor that is located in the engine inlet air path. The absence of any significant manifold filling or depletion in steady-state enables a direct correspondence between MAF and cylinder inlet air rate.

When transient, there is no direct correspondence between MAF and cylinder inlet air rate. As a result, the MAF sensor may not accurately characterize cylinder inlet air rate. This is primarily due to the significant time constant associated with manifold filling or depletion and MAF sensor lag. Transient conditions can arise rapidly during engine operation. Such transient conditions can result from a substantial change in the throttle position (TPS) or by any other condition that perturbs MAP. Any significant perturbation in steady-state operating conditions rapidly injects error in the MAF estimate of cylinder inlet air rate. Accordingly, if a MAF sensor is to be used for cylinder air rate, there must be a reliable determination of whether the engine is operating in steady-state or is transient.

Conventional methods of characterizing the inlet air dynamics as either steady-state or transient include certain disadvantages. For example, one method uses a single engine parameter (e.g., MAP) to detect both entry into and exit from steady-state. However, when using a single parameter to characterize the inlet air dynamics state, signal noise may result in inaccurate state detection. Further, the detection of transitions, especially out of steady-state, may be delayed while waiting for detailed analyses, such as analyses designed to reduce sensitivity to noise. If detection of a transition is delayed, cylinder inlet air rate estimation accuracy may be degraded.

SUMMARY OF THE INVENTION

Accordingly, the present invention provides an inlet air dynamics (IAD) characterization control system for an internal combustion engine. The IAD characterization control system includes a first module that estimates a future firing event manifold absolute pressure (MAP) and a second module that determines a MAP cycle difference based on the future firing event MAP and a previous cycle MAP. A third module characterizes an IAD state based on the MAP cycle difference.

In one feature, the IAD state is one of a transient state and a steady-state.

In another feature, the future firing event MAP is determined based on at least one of a current MAP, a previous MAP, a current manifold air flow (MAF) and a previous MAF.

In another feature, the third module characterizes the IAD state by comparing the MAP cycle difference to a MAP cycle difference threshold.

In still other features, a fourth module determines a moving average MAP cycle difference based on the MAP cycle difference. The IAD state is further based on the moving average MAP cycle difference. The third module characterizes the IAD state by comparing the MAP cycle difference to a MAP cycle difference threshold and the moving average MAP cycle difference to a moving average MAP cycle difference threshold. The IAD state is steady-state if the MAP cycle difference and the moving average MAP cycle difference are less than their respective thresholds.

In yet another feature, the third module determines a cylinder air rate estimation routine based on the IAD state.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
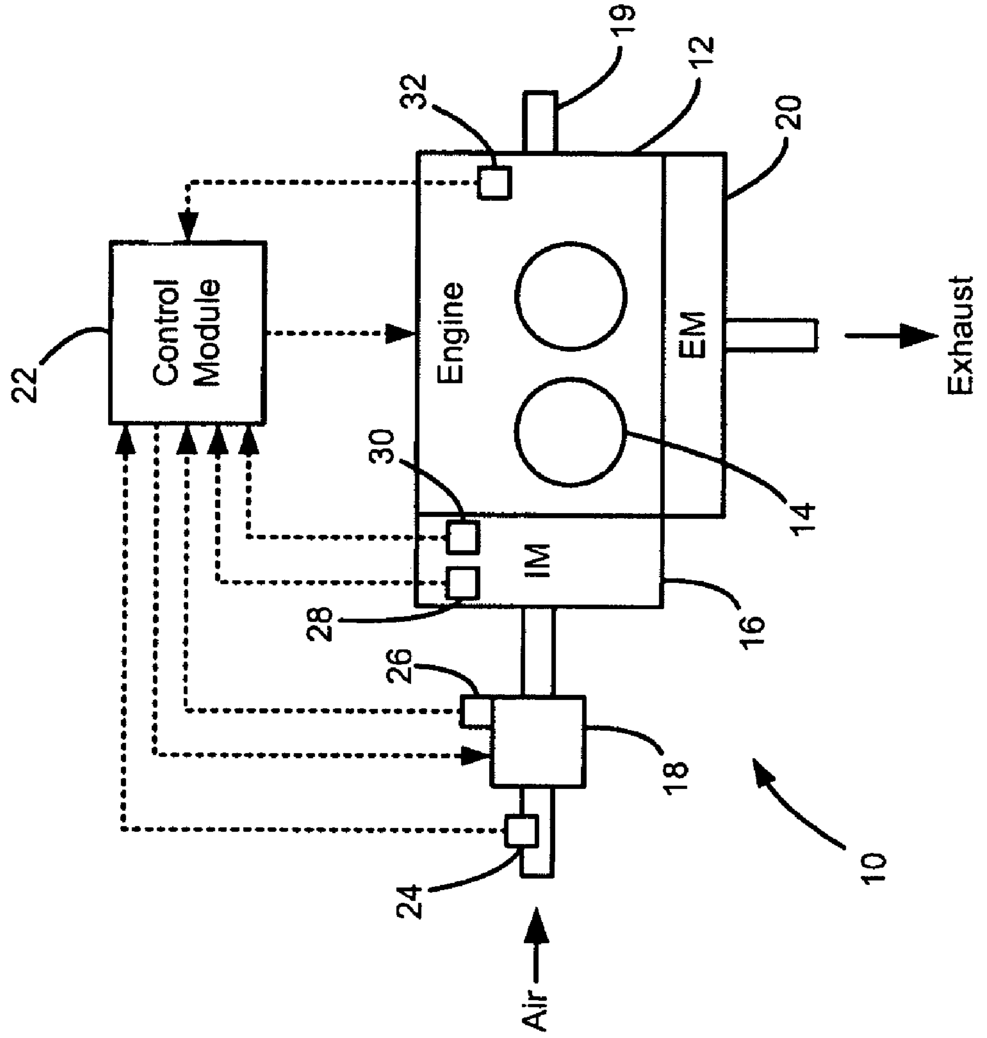
FIG. 1 is a functional block diagram of an exemplary engine system that is regulated using an inlet air dynamics (IAD) characterization control in accordance with the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary engine system 10 is illustrated. The engine system 10 includes an engine 12 that combusts an air and fuel mixture within N cylinders 14. Although two cylinders are illustrated (i.e., N=2), it is appreciated that the engine 12 can include more or fewer cylinders (e.g., N=1, 3, 4, 5, 6, 8, 10, 12). Air is drawn into an intake manifold 16 through a throttle 18. The air is distributed to the cylinders and is mixed with fuel. The air/fuel mixture is combusted to reciprocally drive pistons (not shown) within the cylinders 14. The pistons rotatably drive a crankshaft 19 that transmits drive torque to a drivetrain (not shown). Combustion gases are exhausted from the cylinders 14 to an exhaust after-treatment system through an exhaust manifold 20.

A control module 22 regulates operation of the engine system 10 based on a plurality of engine operating parameters. More specifically, a mass air flow (MAF) sensor 24 generates a MAF signal and a throttle position sensor 26 generates a throttle position signal (TPS). An intake manifold absolute pressure (MAP) sensor 28 generates a MAP signal and a manifold air temperature (MAT) sensor 30 generates a MAT signal. An engine speed sensor 32 generates an engine RPM signal based on a rotational speed of the crankshaft 19. The various signals are transmitted to the control module 22, which regulates engine operation based thereon. For example, the control module 22 can regulate a position of the throttle 18 to control air flow into the engine 12. Further, the control module 22 can regulate fueling to the cylinders 14 to provide a desired air-to-fuel (A/F) ratio.

The control module 22 estimates the cylinder air rate based on the state of the engine inlet air dynamics (i.e., transient or steady-state). More specifically, the control module 22 determines whether the inlet air dynamics (IAD) is either transient or steady-state based on the IAD characterization control of the present invention. The control module 22 implements a corresponding cylinder air rate estimation routine based on the IAD characterization. For example, if the IAD is in steady-state the MAF as measured by the mass airflow sensor 24 is used to estimate the mass of air entering the cylinders 14 based on the following equation:

$$m_a = 120\frac{MAF}{N * RPM}$$

However if the IAD is transient, the estimate of the mass of air entering the cylinders 14 is obtained using the "speed density" approach, in accordance with the following equation:

$$m_a = \frac{\eta_v V_d P_m}{RT_c}$$

where $\eta_v$ is the volumetric efficiency of the engine 12, $V_d$ is the displacement volume of the engine, R is the universal gas constant and $T_c$ is the temperature of the air entering the cylinder (in degrees Kelvin).

The IAD characterization control of the present invention estimates MAP for a future cylinder firing event based on the following relationship:

$$MAP_{EST}(k+1)=k_{MAP0}MAP_{EST}(k)+k_{MAP1}MAP_{EST}(k-N)+k_{MAP2}MAP_{EST}(k-2N)+k_{AIR0}MAF(k)+k_{AIR1}MAF(k-1)+k_{AIR2}MAF(k-2)+k_{THR0}TPS(k)+k_{THR1}TPS(k-1)+k_{THR2}TPC(k-2)-k_{ESTGAIN}[MAP_{EST}(k)-MAP_{ACT}(k)]$$

where:

$k_{MAP0 \ldots 2}$ are MAP coefficients;

$k_{AIR0 \ldots 2}$ are cylinder air coefficients;

$k_{THR0 \ldots 2}$ are throttle coefficients;

$k_{ESTGAIN}$ is a gain coefficient;

$MAP_{ACT}(k)$ is the actual MAP based on the MAP signal; and

N is the number of cylinders.

k is the current cylinder firing event. $k_{MAP0 \ldots 2}$, $k_{AIR0 \ldots 2}$ and $k_{THR0 \ldots 2}$ are determined using a suitable method of engine system identification including, but not limited to, a least-squares data fit based on corresponding engine test data. $k_{ESTGAIN}$ is determined using a process similar to calculating a Kalman filter gain and adjusts $MAP_{EST}(k+1)$ based on error in the previous value (i.e., $MAP_{EST}(k)$ versus $MAP_{ACT}(k)$).

A MAP cycle difference ($MAP_{CD}$) is determined as the difference between $MAP_{EST}(k+1)$ and the estimated MAP one engine cycle previous ($MAP_{EST}(k-N)$). A moving average of $MAP_{CD}$ ($MAP_{CDAVG}$) is calculated according to the following equation:

$$MAP_{CDAVG}(k)=MAP_{CDAVG}(k-1)+[MAP_{CD}(k)-MAP_{CD}(k-2N)]/2N$$

In this manner, the current $MAP_{CD}$ is added to $MAP_{CDAVG}$ and the $MAP_{CD}$ from two engine cycles previous is subtracted.

The IAD characterization control compares $MAP_{CD}(k)$ and $MAP_{CDAVG}(k)$ to respective thresholds $MAP_{CDTHR}$ and $MAP_{CDAVGTHR}$ to determine whether the IAD is transient or steady-state. More specifically, if either the absolute value of $MAP_{CD}(k)$ is greater than $MAP_{CDTHR}$ or the absolute value of $MAP_{CDAVG}(k)$ is greater than $MAP_{CDAVGTHR}$, the IAD is characterized as transient. If both the absolute value of $MAP_{CD}(k)$ is less than $MAP_{CDTHR}$ and the absolute value of $MAP_{CDAVG}(k)$ is less than $MAP_{CDAVGTHR}$, the IAD is characterized as steady-state.

Figure 2:
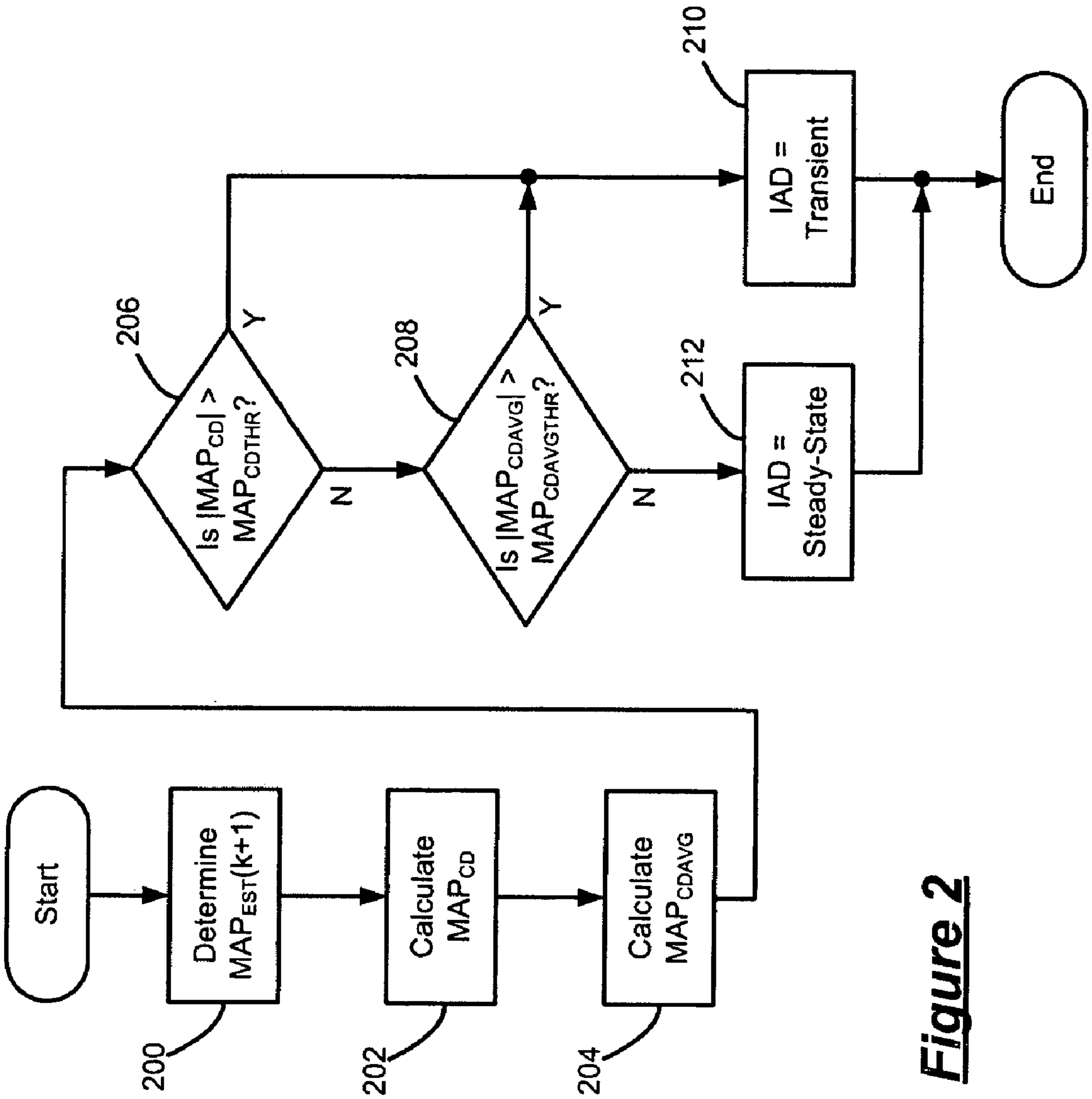
FIG. 2 is a flowchart illustrating exemplary steps executed by the IAD characterization control of the present invention.

Referring now to FIG. 2, exemplary steps executed by the IAD characterization control are illustrated. In step 200, control determines $MAP_{EST}(k+1)$ based on the relationship described in detail above. In step 202 control calculates $MAP_{CD}$. Control calculates $MAP_{CDAVG}$ in step 204. In step 206, control determines whether the absolute value of $MAP_{CD}$ is greater than $MAP_{CDTHR}$. If the absolute value of $MAP_{CD}$ is not greater than $MAP_{CDTHR}$, control continues in step 208. If the absolute value of $MAP_{CD}$ is greater than $MAP_{CDTHR}$, control continues in step 210.

In step 208, control determines whether the absolute value of $MAP_{CDAVG}$ is greater than $MAP_{CDAVGTHR}$. If the absolute value of $MAP_{CDAVG}$ is not greater than $MAP_{CDAVGTHR}$, control continues in step 212. If the absolute value of $MAP_{CDAVG}$ is greater than $MAP_{CDAVGTHR}$, control continues in step 210. In step 210, control characterizes the IAD as transient. In step 212, control characterizes the IAD as steady-state. Operation of the vehicle is then regulated based on the IAD characterization. More specifically, a corresponding cylinder air rate estimation approach is implemented based on the IAD characterization to achieve a desired A/F ratio.

Figure 3:
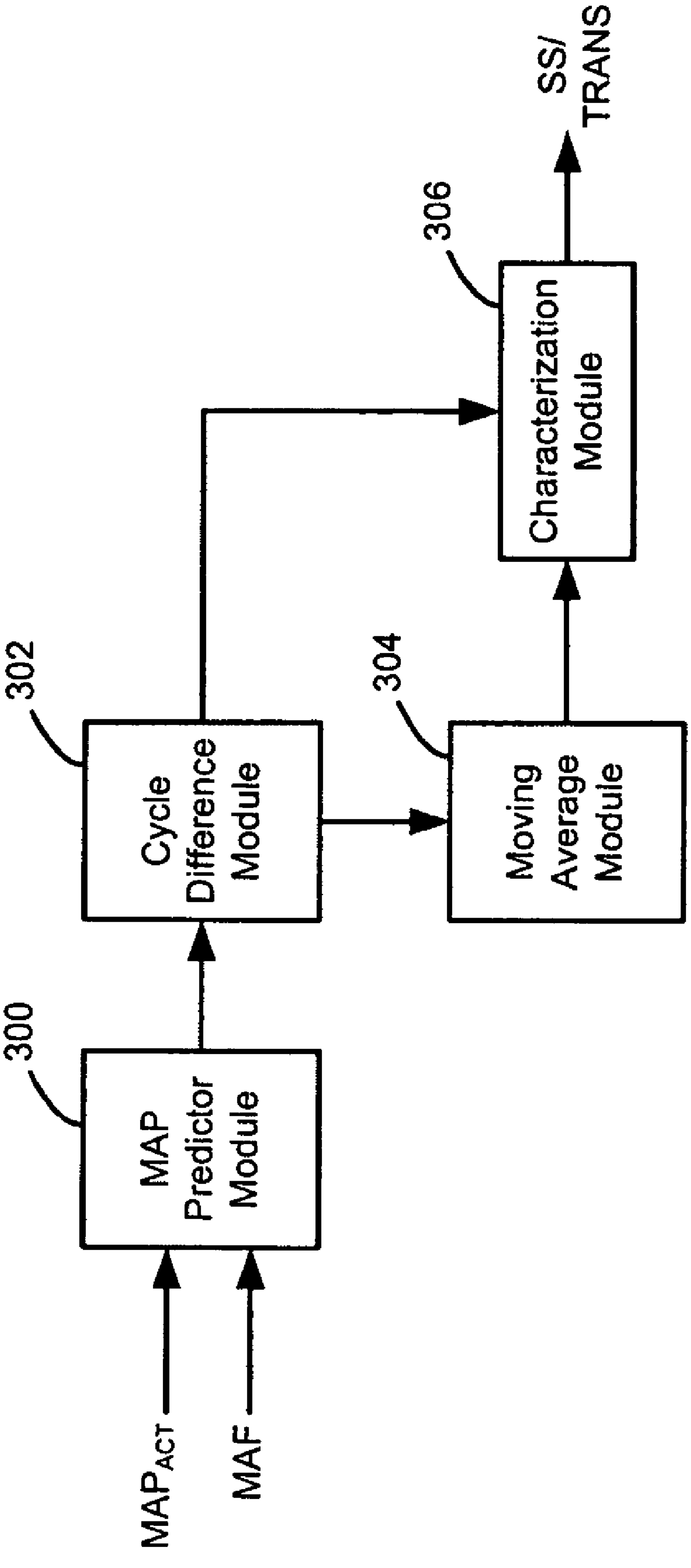
FIG. 3 is a functional block diagram of exemplary modules that execute the IAD characterization control of the present invention.

Referring now to FIG. 3, exemplary modules that execute the IAD characterization control of the present invention will be described in detail. The exemplary modules include a MAP estimation module 300, a cycle difference module 302, a moving average module 304 and a characterization module 306. The map estimation module determines $MAP_{EST}(k+1)$ based on $MAP_{ACT}$ and MAF, as described in detail above. The cycle difference module 302 calculated $MAP_{CD}$ based on $MAP_{EST}(k+1)$ and $MAP_{EST}(k-N)$. The moving average module determines $MAP_{CDAVG}$ as described in detail above. The characterization module 306 characterizes the IAD as either steady-state (SS) or transient (TRNS) based on $MAP_{CD}$ and $MAP_{CDAVG}$.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An inlet air dynamics (IAD) characterization control system for an internal combustion engine, comprising:
- a first module that estimates a future firing event manifold absolute pressure (MAP);
- a second module that determines a MAP cycle difference based on said future firing event MAP and a previous cycle MAP; and
- a third module that characterizes an IAD state based on said MAP cycle difference.

2. The IAD characterization control system of claim 1 wherein said IAD state is one of a transient state and a steady-state.

3. The IAD characterization control system of claim 1 wherein said future firing event MAP is determined based on at least one of a current MAP, a previous MAP, a current manifold air flow (MAF) and a previous MAF.

4. The IAD characterization control system of claim 1 wherein said third module characterizes said IAD state by comparing said MAP cycle difference to a MAP cycle difference threshold.

5. The IAD characterization control system of claim 1 further comprising a fourth module that determines a moving average MAP cycle difference based on said MAP cycle difference, wherein said IAD state is further based on said moving average MAP cycle difference.

6. The IAD characterization control system of claim 5 wherein said third module characterizes said IAD state by comparing said MAP cycle difference to a MAP cycle difference threshold and said moving average MAP cycle difference to a moving average MAP cycle difference threshold.

7. The IAD characterization control system of claim 6 wherein said IAD state is steady-state if said MAP cycle difference and said moving average MAP cycle difference are less than their respective thresholds.

8. The IAD characterization control system of claim 1 wherein said third module determines a cylinder air rate estimation routine based on said IAD state.

9. A method of characterizing inlet air dynamics (IAD) of an internal combustion engine, comprising:
- estimating a future firing event manifold absolute pressure (MAP);
- determining a MAP cycle difference based on said future firing event MAP and a previous cycle MAP; and
- characterizing an IAD state based on said MAP cycle difference.

10. The method of claim 9 wherein said IAD state is one of a transient state and a steady-state.

11. The method of claim 9 wherein said future firing event MAP is determined based on at least one of a current MAP, a previous MAP, a current manifold air flow (MAF) and a previous MAF.

12. The method of claim 9 wherein said step of characterizing said IAD state includes comparing said MAP cycle difference to a MAP cycle difference threshold.

13. The method of claim 9 further comprising determining a moving average MAP cycle difference based on said MAP cycle difference, wherein said IAD state is further based on said moving average MAP cycle difference.

14. The method of claim 13 wherein said step of characterizing said IAD state includes comparing said MAP cycle difference to a MAP cycle difference threshold and said moving average MAP cycle difference to a moving average MAP cycle difference threshold.

15. The method of claim 14 wherein said IAD state is steady-state if said MAP cycle difference and said moving average MAP cycle difference are less than their respective thresholds.

16. A method of regulating engine operation based on inlet air dynamics (IAD), comprising:
- estimating a future firing event manifold absolute pressure (MAP);
- determining a MAP cycle difference based on said future firing event MAP and a previous cycle MAP;
- determining a moving average MAP cycle difference based on said MAP cycle difference;
- characterizing an IAD state based on said MAP cycle difference and said moving average MAP cycle difference; and
- selecting a cylinder air rate estimation routine based on said IAD state.

17. The method of claim 16 wherein said IAD state is one of a transient state and a steady-state.

18. The method of claim 16 wherein said future firing event MAP is determined based on at least one of a current MAP, a previous MAP, a current manifold air flow (MAF) and a previous MAF.

19. The method of claim 16 wherein said step of characterizing said IAD state includes comparing said MAP cycle difference to a MAP cycle difference threshold and said moving average MAP cycle difference to a moving average MAP cycle difference threshold.

20. The method of claim 19 wherein said IAD state is steady-state if said MAP cycle difference and said moving average MAP cycle difference are less than their respective thresholds.

* * * * *